US012652132B2

(12) United States Patent (10) Patent No.: US 12,652,132 B2

Yu et al. (45) Date of Patent: Jun. 9, 2026

(54) HANDLING OF HARQ FEEDBACK ERROR FOR CONFIGURED GRANT

(71) Applicant: NOKIA TECHNOLOGIES OY, Espoo (FI)

(72) Inventors: Ling Yu, Kauniainen (FI); Vinh Van Phan, Oulu (FI); Zexian Li, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 312 days.

(21) Appl. No.: 18/683,094

(22) PCT Filed: Aug. 12, 2021

(86) PCT No.: PCT/EP2021/072475

§ 371 (c)(1),
(2) Date: Feb. 12, 2024

(87) PCT Pub. No.: WO2023/016647

PCT Pub. Date: Feb. 16, 2023

(65) Prior Publication Data

US 2024/0380523 A1     Nov. 14, 2024

(51) Int. Cl.
H04L 1/1812     (2023.01)
H04L 5/00     (2006.01)
H04W 72/12     (2023.01)

(52) U.S. Cl.
CPC .......... H04L 1/1812 (2013.01); H04L 5/0053 (2013.01); H04W 72/12 (2013.01)

(58) Field of Classification Search
None
See application file for complete search history.

(56) References Cited

U.S. PATENT DOCUMENTS

| | | | | |
|---|---|---|---|---|
| 2014/0293917 A1* | 10/2014 | Yoo | H04L 1/0073 | |
| | | | 370/329 | |
| 2022/0353020 A1* | 11/2022 | Ganesan | H04L 1/1887 | |
| 2023/0080600 A1* | 3/2023 | Lee | H04L 1/1825 | |
| | | | 370/329 | |
| 2023/0421331 A1* | 12/2023 | Marinier | H04L 1/003 | |
| 2025/0240795 A1* | 7/2025 | Lee | H04W 4/40 | |

\* cited by examiner

*Primary Examiner* — Walter J Divito

(74) *Attorney, Agent, or Firm* — Barta Jones, PLLC

(57) ABSTRACT

Techniques of time-sensitive communications include receiving, by the gNB, an indication based on received transport blocks of a burst that the user equipment misinterpreted HARQ feedback and sends the user equipment a command to perform a transport block mitigation operation to change the scheduled delivery of subsequent transport blocks of the burst.

20 Claims, 8 Drawing Sheets

Example Wireless Network 130

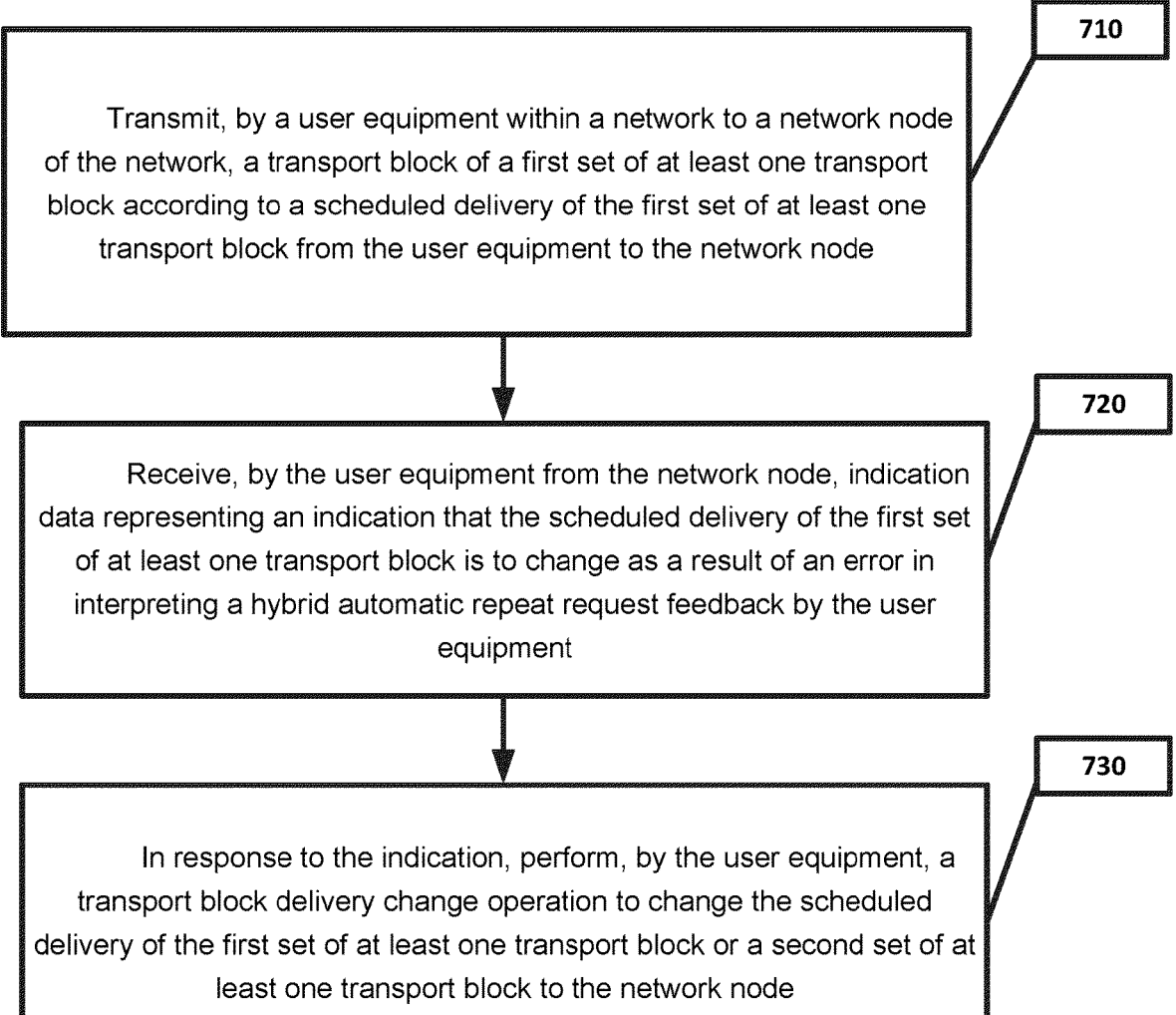

700

710

Transmit, by a user equipment within a network to a network node of the network, a transport block of a first set of at least one transport block according to a scheduled delivery of the first set of at least one transport block from the user equipment to the network node

720

Receive, by the user equipment from the network node, indication data representing an indication that the scheduled delivery of the first set of at least one transport block is to change as a result of an error in interpreting a hybrid automatic repeat request feedback by the user equipment

730

In response to the indication, perform, by the user equipment, a transport block delivery change operation to change the scheduled delivery of the first set of at least one transport block or a second set of at least one transport block to the network node

HANDLING OF HARQ FEEDBACK ERROR FOR CONFIGURED GRANT

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/ s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes determining, by a network node of a network, an error in interpreting, by a user equipment, a hybrid automatic repeat request feedback from the network node to the user equipment for a transport block of a first set of at least one transport block being transmitted from the user equipment to the network node according to a scheduled delivery of the first set of at least one transport block or a second set of at least one transport block. The method further includes performing, by the network node in response to the determining, a transport block mitigation operation to change the scheduled delivery of the first set of at least one transport block or the second set of at least one transport block.

According to an example implementation, an apparatus includes at least one processor and at least one memory including computer program code, the at least one memory and the computer program code configured to, with the at least one processor, cause the apparatus at least to determine, by a network node of a network, an error in interpreting, by a user equipment, a hybrid automatic repeat request feedback from the network node to the user equipment for a transport block of a first set of at least one transport block being transmitted from the user equipment to the network node according to a scheduled delivery of the first set of at least one transport block or a second set of at least one transport block. The at least one memory and the computer program code are further configured to, with the at least one processor, cause the apparatus at least to perform, by the network node in response to the determining, a transport block mitigation operation to change the scheduled delivery of the first set of at least one transport block or the second set of at least one transport block.

According to an example implementation, an apparatus includes means for determining, by a network node of a network, an error in interpreting, by a user equipment, a hybrid automatic repeat request feedback from the network node to the user equipment for a transport block of a first set of at least one transport block being transmitted from the user equipment to the network node according to a scheduled delivery of the first set of at least one transport block or a second set of at least one transport block. The apparatus also includes means for performing, by the network node in response to the determining, a transport block mitigation operation to change the scheduled delivery of the first set of at least one transport block or the second set of at least one transport block.

According to an example implementation, a computer program product includes a computer-readable storage medium and storing executable code that, when executed by at least one data processing apparatus, is configured to cause the at least one data processing apparatus to determine, by a network node of a network, an error in interpreting, by a user equipment, a hybrid automatic repeat request feedback from the network node to the user equipment for a transport block of a first set of at least one transport block being transmitted from the user equipment to the network node according to a scheduled delivery of the first set of at least one transport block or a second set of at least one transport block. The executable code, when executed by at least one data processing apparatus, is also configured to cause the at least one data processing apparatus to perform, by the network node in response to the determining, a transport block mitigation operation to change the scheduled delivery of the first set of at least one transport block or the second set of at least one transport block.

According to an example implementation, a method includes transmitting, by a user equipment within a network to a network node of the network, a transport block of a first set of at least one transport block according to a scheduled delivery of the first set of at least one transport block from the user equipment to the network node. The method further includes receiving, by the user equipment from the network node, indication data representing an indication that the scheduled delivery of the first set of at least one transport block is to change as a result of an error in interpreting a hybrid automatic repeat request feedback by the user equipment. The method further includes, in response to the indication, performing, by the user equipment, a transport block delivery change operation to change the scheduled delivery of the first set of at least one transport block or a second set of at least one transport block to the network node.

According to an example implementation, an apparatus includes at least one processor and at least one memory including computer program code, the at least one memory and the computer program code configured to, with the at least one processor, cause the apparatus at least to transmit, by a user equipment within a network to a network node of the network, a transport block of a first set of at least one transport block according to a scheduled delivery of the first set of at least one transport block from the user equipment to the network node. The at least one memory and the computer program code are further configured to receive, by the user equipment from the network node, indication data representing an indication that the scheduled delivery of the first set of at least one transport block is to change as a result of an error in interpreting a hybrid automatic repeat request feedback by the user equipment. The at least one memory and the computer program code are further configured to, in response to the indication, perform, by the user equipment, a transport block delivery change operation to change the scheduled delivery of the first set of at least one transport block or a second set of at least one transport block to the network node.

According to an example implementation, an apparatus includes means for transmitting, by a user equipment within a network to a network node of the network, a transport block of a first set of at least one transport block according to a scheduled delivery of the first set of at least one transport block from the user equipment to the network node. The apparatus also includes means for receiving, by the user equipment from the network node, indication data representing an indication that the scheduled delivery of the first set of at least one transport block is to change as a result of an error in interpreting a hybrid automatic repeat request feedback by the user equipment. The apparatus further includes means for, in response to the indication, performing, by the user equipment, a transport block delivery change operation to change the scheduled delivery of the first set of at least one transport block or a second set of at least one transport block to the network node.

According to an example implementation, a computer program product includes a computer-readable storage medium and storing executable code that, when executed by at least one data processing apparatus, is configured to cause the at least one data processing apparatus to transmit, by a user equipment within a network to a network node of the network, a transport block of a first set of at least one transport block according to a scheduled delivery of the first set of at least one transport block from the user equipment to the network node. The executable code, when executed by at least one data processing apparatus, is also configured to cause the at least one data processing apparatus to receive, by the user equipment from the network node, indication data representing an indication that the scheduled delivery of the first set of at least one transport block is to change as a result of an error in interpreting a hybrid automatic repeat request feedback by the user equipment. The executable code, when executed by at least one data processing apparatus, is also configured to cause the at least one data processing apparatus to, in response to the indication, perform, by the user equipment, a transport block delivery change operation to change the scheduled delivery of the first set of at least one transport block or a second set of at least one transport block to the network node.

The details of one or more examples of implementations are set forth in the accompanying drawings and the description below. Other features will be apparent from the description and drawings, and from the claims.

BRIEF DESCRIPTION OF THE DRAWINGS

FIG. 7 is a flow chart illustrating a process of correcting an error in interpreting HARQ feedback according to an example implementation.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
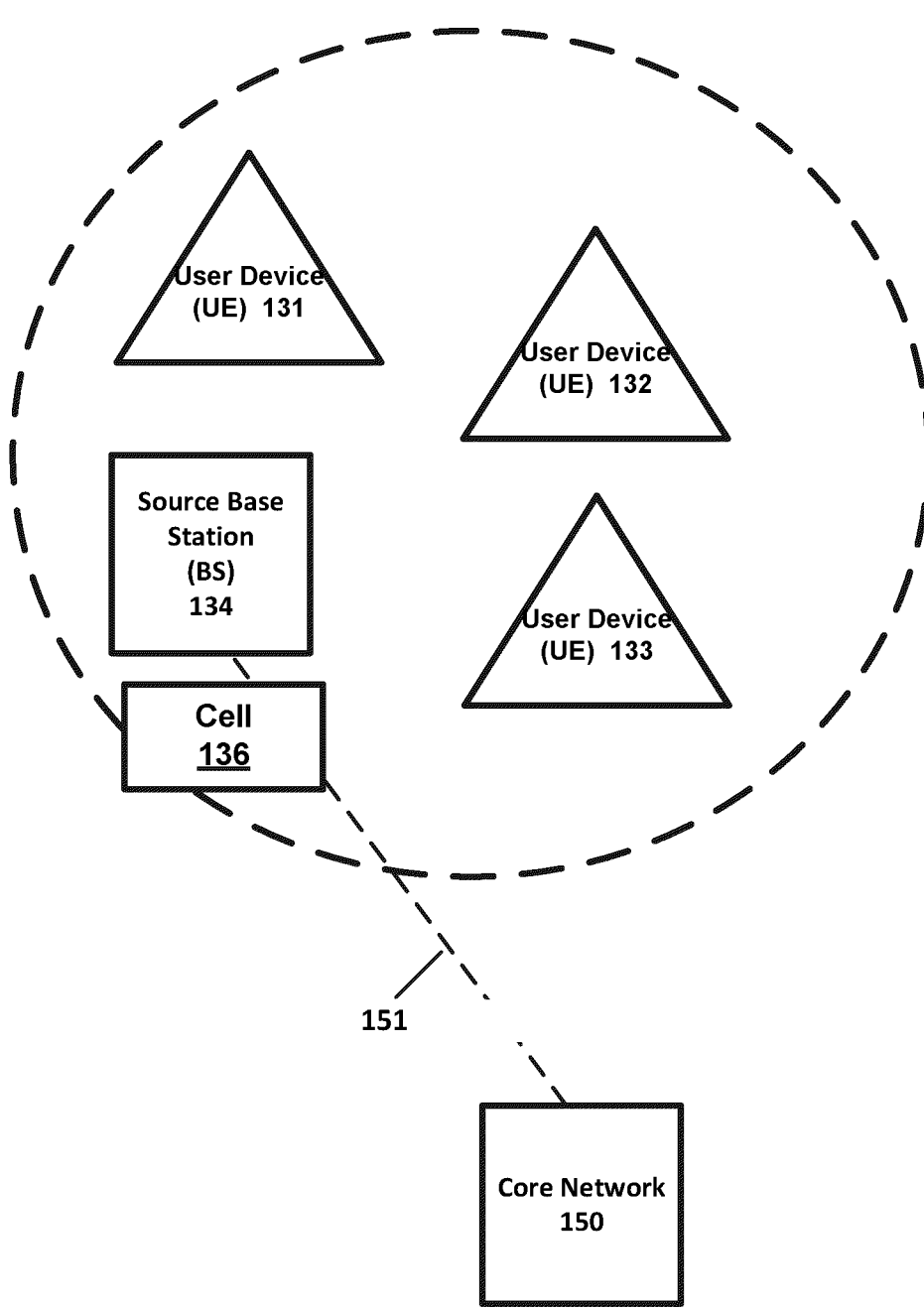
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Time-Sensitive Communication (TSC) is a key application targeted by NR IIoT in 3GPP standardization. Many TSC traffics have deterministic and periodic nature, and the packets of which are fed into 5GS for communications over NR to enable wireless connections for use cases such as smart factories.

Devices cooperating with each other within Time Sensitive Network (TSN) (aka. Time Sensitive Communications (TSC) network) are required to be strictly synchronized with each other. Depending on the use case, the required synchronization accuracy can be as high as 10 microseconds, 1 microsecond or even 250 nanoseconds. An example of such a use case may be found in an automated manufacturing environment in which networked devices (e.g., robots) need to share information in real time in order to perform process operations at specified times. In such an environment, the devices may need to be synchronized to within a microsecond in order to ensure the processes are carried out correctly.

Rel-17 states that survival time in a TSC can be provided to a radio access network (RAN) as a new quality of service (QoS) parameter. Survival time is defined as the time that an application consuming a communication service may continue without an anticipated message.

The survival time indicates to the communication service the time available to recover from failure. More importantly, the survival time can be expressed as a time period or, especially with cyclic traffic, as maximum number of consecutive incorrectly received or lost messages. When survival time is violated (i.e. N consecutive messages are not successfully delivered), the application could be halted. An example is shown in FIG. 2, where survival time is violated to hence result in application failure when N consecutive packets (N=2 in the example of FIG. 2) are not delivered successfully.

Figure 2:
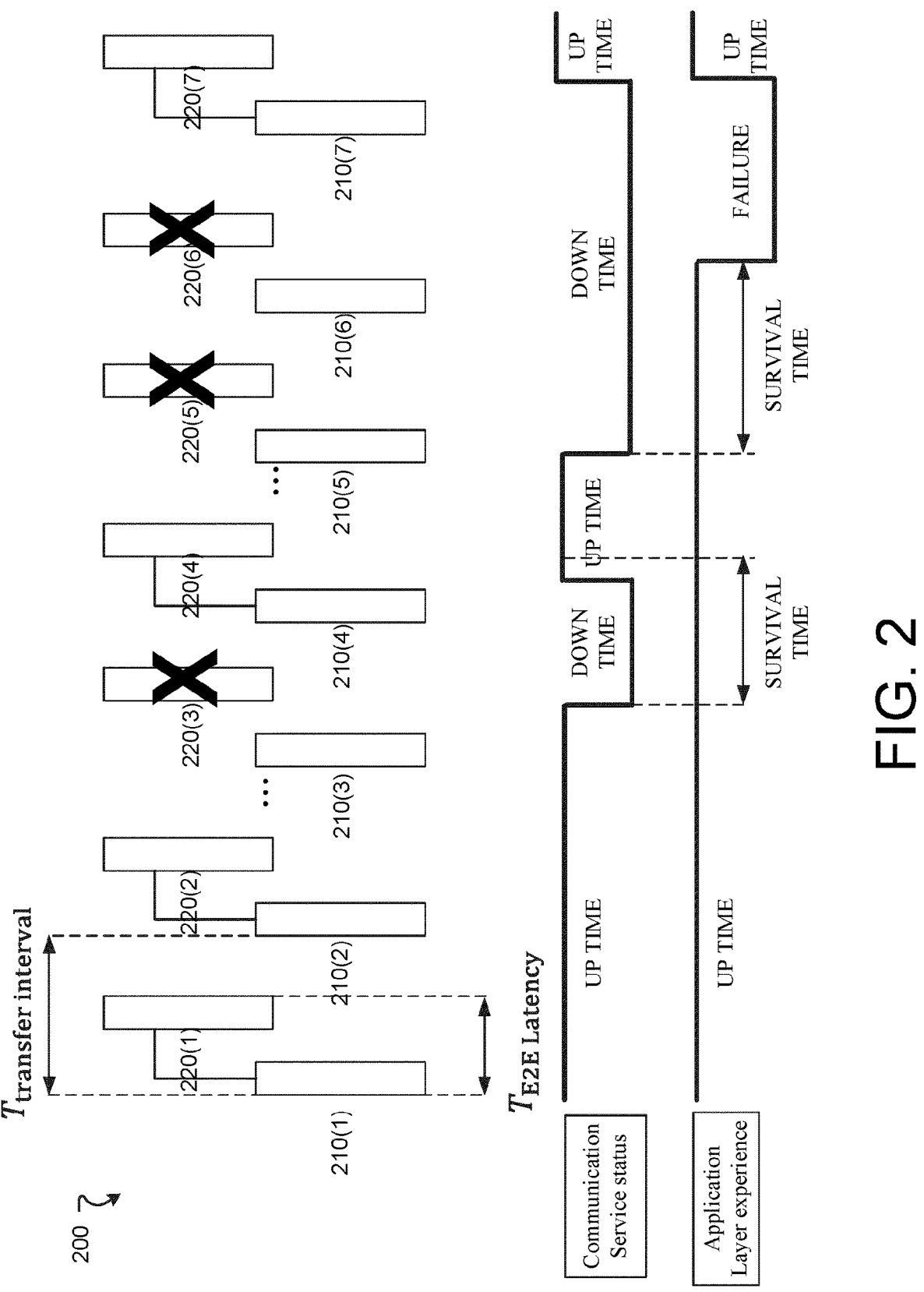
FIG. 2 is a diagram illustrating a survival time requirement of time sensitive communications (TSC), which is translatable to number of consecutive packet delivery failure according to an example implementation.

FIG. 2 is a diagram illustrating a survival time requirement of time sensitive communications (TSC), which is translatable to number of consecutive packet delivery failure. FIG. 2 shows an example transmission 300 of transport blocks (TBs) 210(1 . . . 7) from UE to gNB. It is noted that, while the transport block 210(3) was not received properly 220(3), the resulting down time did not exceed the survival time so the missing TB did not cause the application (defined in the application layer) to be affected. In contrast, consecutive TBs 210(5) and 210(6) are not received properly as seen in 220(5) and 220(6), the resulting down time exceeds the survival time, causing a failure in the application.

It is noted that a data burst is defined herein as a set of transport blocks.

Figure 3:
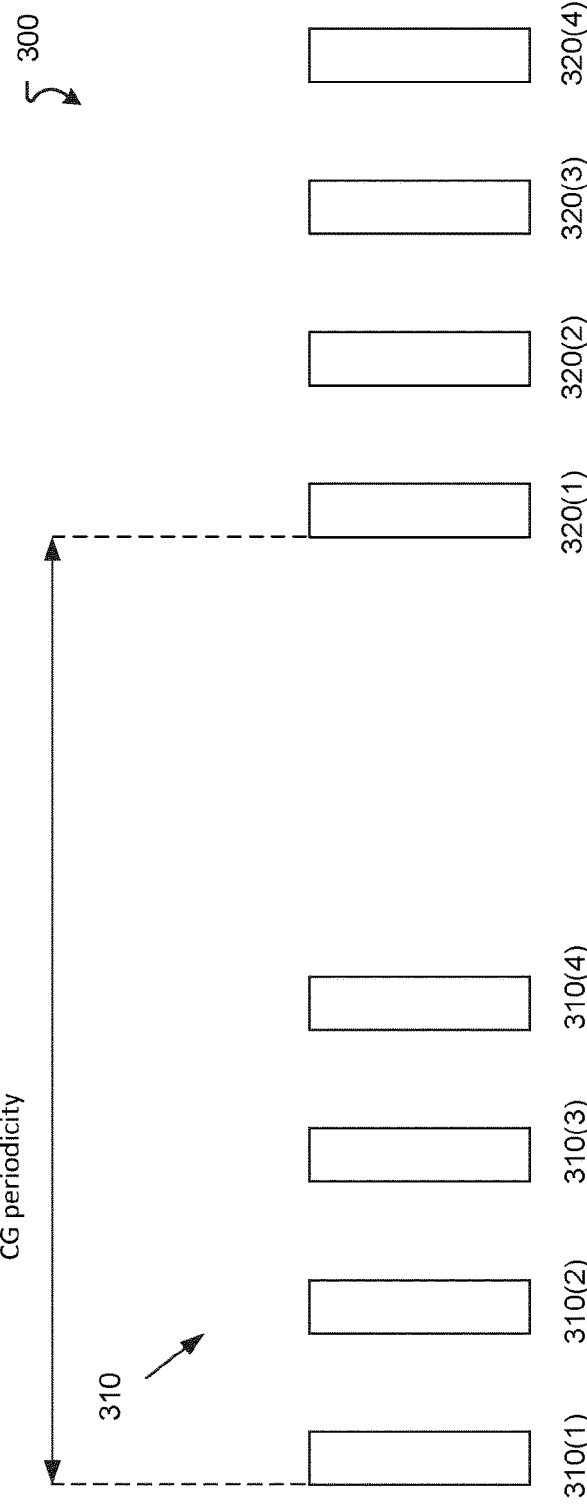
FIG. 3 is a diagram illustrating multiple configured grant (CG) scenario for multiple transport blocks (TBs), according to an example implementation.

FIG. 3 is a diagram illustrating a multiple configured grant (CG) configurations scenario 300 for multiple transport blocks (TBs) 310(1 . . . 4) of the same burst.

The following two assumptions are assumed herewith.

The gNB configures at least two configured grants (CGs) to the UE for the traffic having survival time requirements.

CG #1: contains a smaller set of radio resources with less robust MCS, mainly targeted to transmit the burst of which the previous burst was delivered correctly.

CG #2: contains a larger set of radio resources with more robust MCS, mainly targeted to transmit the burst of which the previous burst was not delivered correctly.

CG #1 and CG #2 may be configured either in the same frequency band or different frequency bands (licensed band and/or unlicensed band) in the same TTI or different TTIs, with totally different scheduled radio resources or (partially) overlapping radio resources.

The UE is configured to use CG #1 by default for traffic transmission. Instead of or in addition to CG #1, CG #2 is used if the previous burst is not delivered correctly. To further enhance the efficiency of radio resource usage, gNB may schedule the resource of CG #2 to the other UEs if CG #2 is not used by the UE.

In conventional approaches to TSC, whether the previous burst is delivered or not may be determined based on hybrid automatic repeat/request (HARQ) acknowledge/not acknowledge (ACK/NACK) feedback from a receiving entity e.g. using CG-DFI specified for NR unlicensed operation or UL grant for retransmission. However, it may happen that HARQ ACK/NACK feedback is mis-interpreted by the UE. For example, if HARQ NACK is mis-interpreted as ACK feedback, UE may continue using CG #1. But CG #1 is configured with less robust MCS and therefore more error proneness, which may cause the loss of multiple consecutive bursts to violate the survival time. This problem becomes more severe if gNB allocates the resources of CG #1 to other UE when gNB assumes UE will use CG #2 to transmit the coming bursts after sending HARQ NACK(s) for the previous burst.

Alternatively, HARQ ACK may be misinterpreted as NACK/DTX feedback. For example, the UE may misinterpret or even miss PDCCH carrying HARQ-ACK feedback (in case with unlicensed URLLC operation). In this case, when HARQ-ACK is misinterpreted as NACK or DTX, UE may be triggered to use CG #2 instead of or in addition to CG #1. Though use of both CG #1 and CG #2 by the UE does not impact the UE's transmission in term of survival time, the gNB may already schedule the resource of CG #2 to another UE which may cause the interference to another UE's transmission if the UE in question also use CG #2 unnecessarily. Accordingly, the radio resource efficiency may be negatively affected.

In contrast to the above-described conventional approaches to TSC, improved techniques of TSC include receiving, by the gNB, an indication based on received transport blocks of a burst that the user equipment misinterpreted HARQ feedback and sends the user equipment a command to perform a transport block mitigation operation to change the scheduled delivery of subsequent transport blocks of the burst.

Advantageously, the above-described improved technique for TSC accounts for misinterpretations of HARQ feedback by the user equipment when support of survival time is considered in a radio access network (RAN). This in turn makes it more likely that survival time conditions are met in more efficient way in term of radio resource usage and as a result, applications run more smoothly within the network.

The improved technique is related to support of deterministic traffic (i.e., sent according to a schedule) with survival time requirement in RAN. Though survival time requirement is defined on burst level, the message/data in one burst may be segmented and transmitted into multiple transport blocks (TBs) over RAN between UE and gNB. To avoid unnecessary transmission of useless TBs over air interface to achieve better efficiency of radio resource usage, UE may be configured to cease the transmission of subsequent TBs of the same burst if the UE identifies the previous TBs are not delivered to the gNB correctly, e.g. based on HARQ feedback or other indications from the gNB. The improved techniques, considering such UE behaviour, proposes the following HARQ feedback error handling mechanism in different error scenarios.

To handle NACK→ACK error:

If there are multiple TBs for one burst and any TB before the last TB in the same burst is not delivered correctly, gNB feedback NACK to the following TBs of the same burst to trigger the UE stop the transmission of the following TBs. This can be considered as implicit "early termination" indication from the gNB to UE for stop the transmission of the rest TBs in the same burst. Or the gNB can explicitly indicate UE to stop transmission of the rest TBs in the same burst after the gNB receives the first transmission of the rest TB from UE (i.e. when the gNB detects NACK-ACK error in UE side).

If there is only one TB for one burst or the last TB in one burst is not delivered correctly, but UE misinterpreted the HARQ NACK as ACK, UE continuously uses CG #1 to transmit the next burst. When the gNB identifies UE using CG #1 for the next burst by detecting corresponding DMRS associated with CG #1 before decoding/receiving the whole transmission from UE using CG #1, the gNB can either trigger dynamic grant or trigger UE to use CG #2 if it is still possible (e.g. if CG #2 is configured not on the same TTI as CG #1). This is for fast triggering of retransmission of the burst to avoid violation of survival time. If the dynamic grant is triggered, the indication of the burst (e.g. burst ID) or association with the previous burst transmission should be provided so that UE can identify that the dynamic grant should be used for transmission of the previous burst that UE is just transmitted to the gNB using CG #1.

To handle ACK→NACK/DTX error (gNB assume UE using CG #1 while UE using CG #2):

If there are multiple TBs for one burst and any TB before the last TB in the burst is correctly received by the gNB but HARQ ACK feedback is interpreted by UE as NACK/DTX, the UE may stop transmitting the rest TB of the same burst.

In a proactive approach, the gNB may send an explicit indication (e.g. in the PDCCH of the slot that CG is configured for next TB transmission) to the UE for triggering the transmission of the rest TBs with CG #1.

In a reactive approach, the gNB, upon detecting missed transmission of next TB from UE, may be triggered to send a dynamic grant to trigger the UE transmit the rest TBs of the same burst. In case with the dynamic grant, the indication of the burst (e.g. burst ID) or association with the previous transmitted TB should be provided so that UE can identify that the dynamic grant should be used for transmission of the rest TBs in the same burst as the previous transmitted TB.

If there is only one TB for one burst or the last TB in one burst is received correctly by gNB but HARQ ACK feedback is interpreted by UE as NACK/DTX, UE may be triggered to use CG #2 for next burst transmission. In this case, upon receiving the previous burst correctly and determining to allocate the resources of CG #2 to another UE, gNB also indicates in PDCCH to the UE in question to use CG #1 instead of CG #2 in the slot where either CG #1 or CG #2 is allocated.

In some implementations, CG #1 may be scheduled in unlicensed band or FR2 of licensed band where the high reliability transmission is not essential while CG #2 may be scheduled in FR1 of licensed band to offer better reliability for the transmission.

Figure 4:
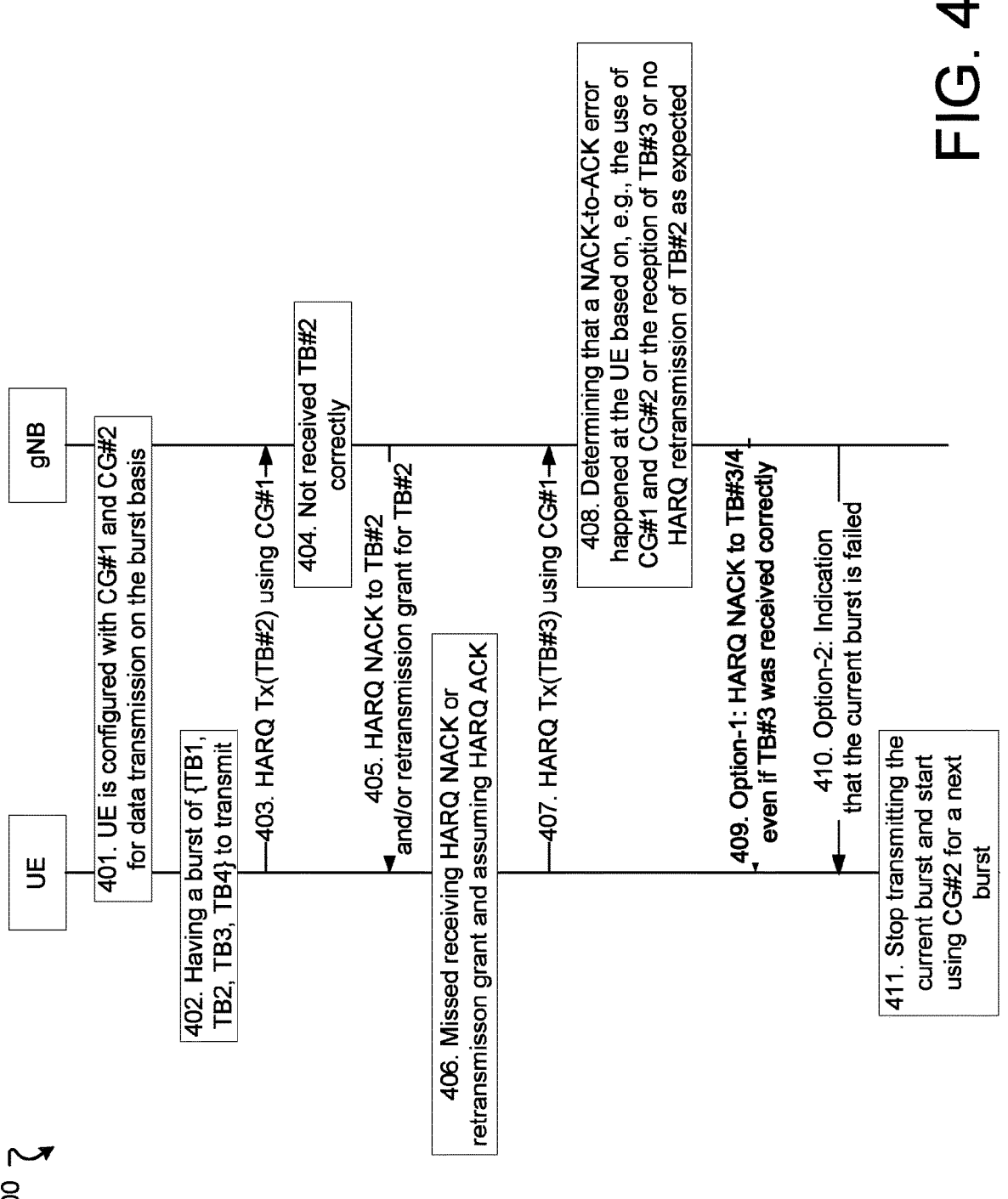
FIG. 4 is a sequence diagram illustrating a process of correcting a NACK→ACK error according to an example implementation.

In some implementations, if data of one data burst are transmitted via multiple TBs, the gNB can associate or identify the previous or next TBs belonging to the same data burst. The identification of multiple TBs belonging to the same data burst may be based on the burst information e.g. burst periodicity, burst arrival time in TSCAI and burst size (e.g. MDBV) as part of QoS profile. Based on burst information and associated QoS such as MDBV and/or latency, UE channel condition as well as radio resource usage situation, the gNB may determine to schedule multiple CG #1s and CG #2s that correspond to the multiple TBs of the same burst as illustrated in FIG. 4. By identifying the type of configured grant, CG #1 and/or CG #2, the gNB may be able to associate the previous and next TBs of the same burst.

FIG. 4 is a sequence diagram illustrating a process 500 of correcting a NACK→ACK error.

At 401, the UE is initially configured with CG #1 and CG #2 for transmission of data bursts, wherein CG #1 may be configured to transmit the data burst by default and CG #2 may be configured to transmit the data burst if the previous data burst is not delivered correctly.

At 402, the UE prepares to transmit a data burst that has four TBs (TB #1, TB #2, TB #3, TB #4) to the gNB.

At 403, the UE transmits each TB (e.g. TB #2) to the gNB with retransmission mechanism of HARQ under CG #1.

At 404, the gNB determines that it did not receive some of TB (e.g. TB #2) successfully.

At 405, the gNB transmits a HARQ NACK to the UE in response to the determination that the gNB did not receive the transmitted TB (e.g. TB #2) successfully.

At 406, the UE incorrectly interprets the NACK as an ACK, i.e., the UE assumes the transmitted TB (e.g. TB #2) was received successfully by the gNB despite the gNB sending a NACK.

At 407, because the UE incorrectly interpreted the NACK as an ACK, the UE transmits the subsequent TB (e.g. TB #3), to the gNB using HARQ retransmission mechanism under CG #1.

At 408, the gNB determines that the UE interpreted the NACK as an ACK in error based on the use of CG #1 in sending the subsequent TB (e.g. TB #3), or based on not receiving a HARQ retransmission of TB #2 as expected.

At 409, as a first option, the gNB transmits a HARQ NACK for the subsequent TB transmission (e.g. TB #3 and TB #4), i.e., all transmitted subsequent TBs, even if the transmitted subsequent TBs (e.g. TB #3) was received successfully at the gNB.

At 410, as a second option, the gNB sends indication indicating that the transmission of the data burst has failed.

At 411, in response to either of the first option or the second option, the UE ceases transmission of the data burst and begins transmission of the next data burst under CG #2.

Figure 5:
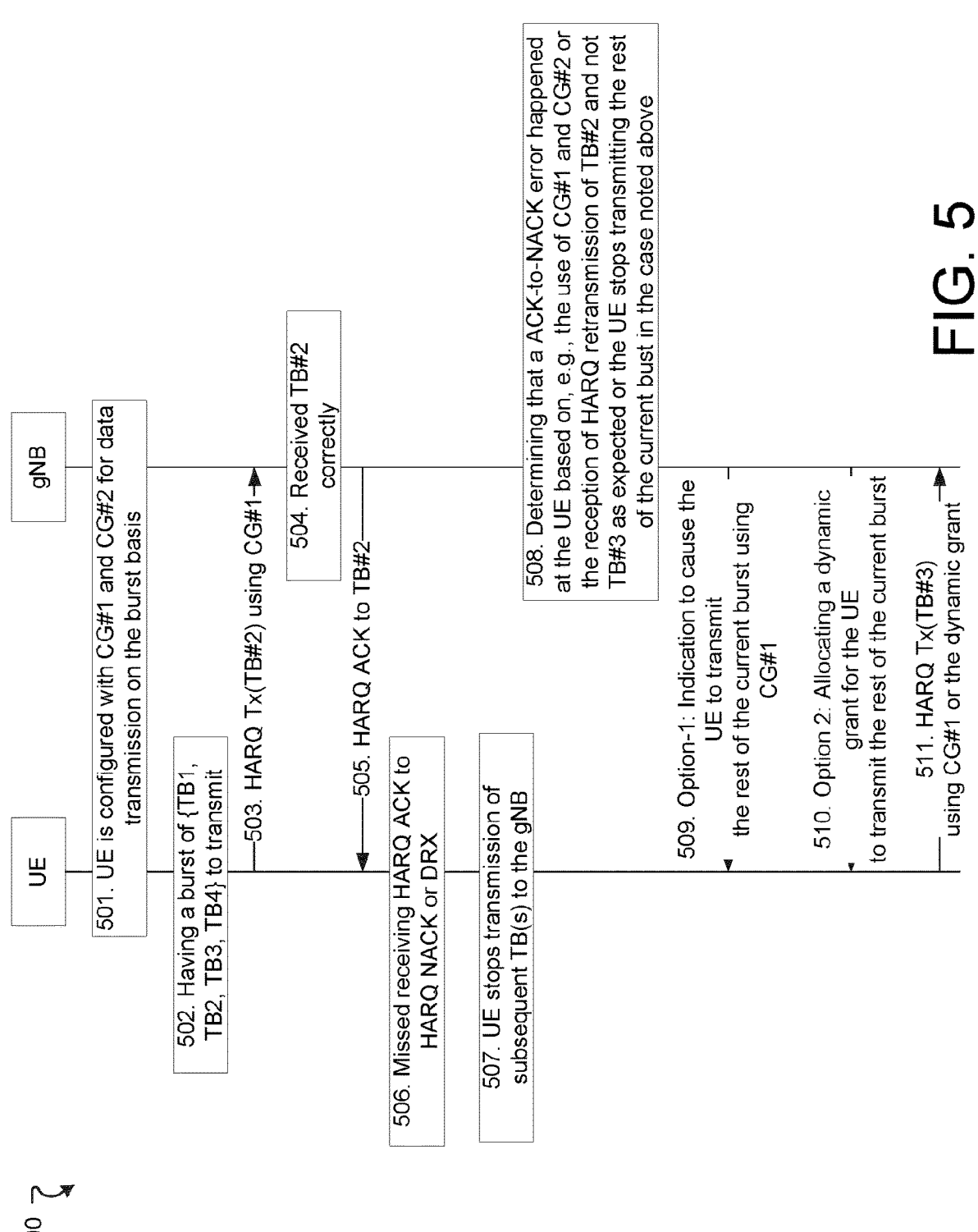
FIG. 5 is a sequence diagram illustrating a process of correcting a ACK→NACK error according to an example implementation.

FIG. 5 is a sequence diagram illustrating a process 600 of correcting a ACK→NACK error.

At 501, the UE is initially configured with CG #1 and CG #2 for transmission of data bursts, wherein CG #1 may be configured to transmit the data burst by default and CG #2 may be configured to transmit the data burst if the previous data burst is not delivered correctly.

At 502, the UE prepares to transmit a data burst that has four TBs (TB #1, TB #2, TB #3, TB #4) to the gNB.

At 503, the UE transmits each TB (e.g. TB #2) to the gNB using a HARQ retransmission mechanism under CG #1.

At 504, the gNB determines that it received the transmitted TB (e.g. TB #2) successfully.

At 505, the gNB transmits a HARQ ACK to the UE in response to the determination that the gNB received the transmitted TB (e.g. TB #2) successfully.

At 506, the UE incorrectly interprets the ACK as a NACK or DRX, i.e., the UE assumes the transmitted TB (e.g. TB #2) was not received successfully by the gNB despite the gNB sending an ACK.

At 507, because the UE incorrectly interpreted the ACK as a NACK or DTX, the UE stops transmission of the subsequent TB(s) (e.g. TB #3) to the gNB.

At 508, the gNB determines that the UE interpreted the ACK as a NACK in error based on the based on not receiving a HARQ transmission of the subsequent TB, TB #3 as expected.

At 509, as a first option, the gNB sends indication indicating that the transmission of the previous TBs of the data burst had succeeded to cause the UE to transmit the rest of the data burst using CG #1.

At 510, as a second option, the gNB allocates a dynamic grant for the UE to transmit the rest of the data burst.

At 511, in response to either of the first option or the second option, the UE resumes transmission of the rest TB(s) of the data burst under CG #1 or the dynamic grant.

Figure 6:
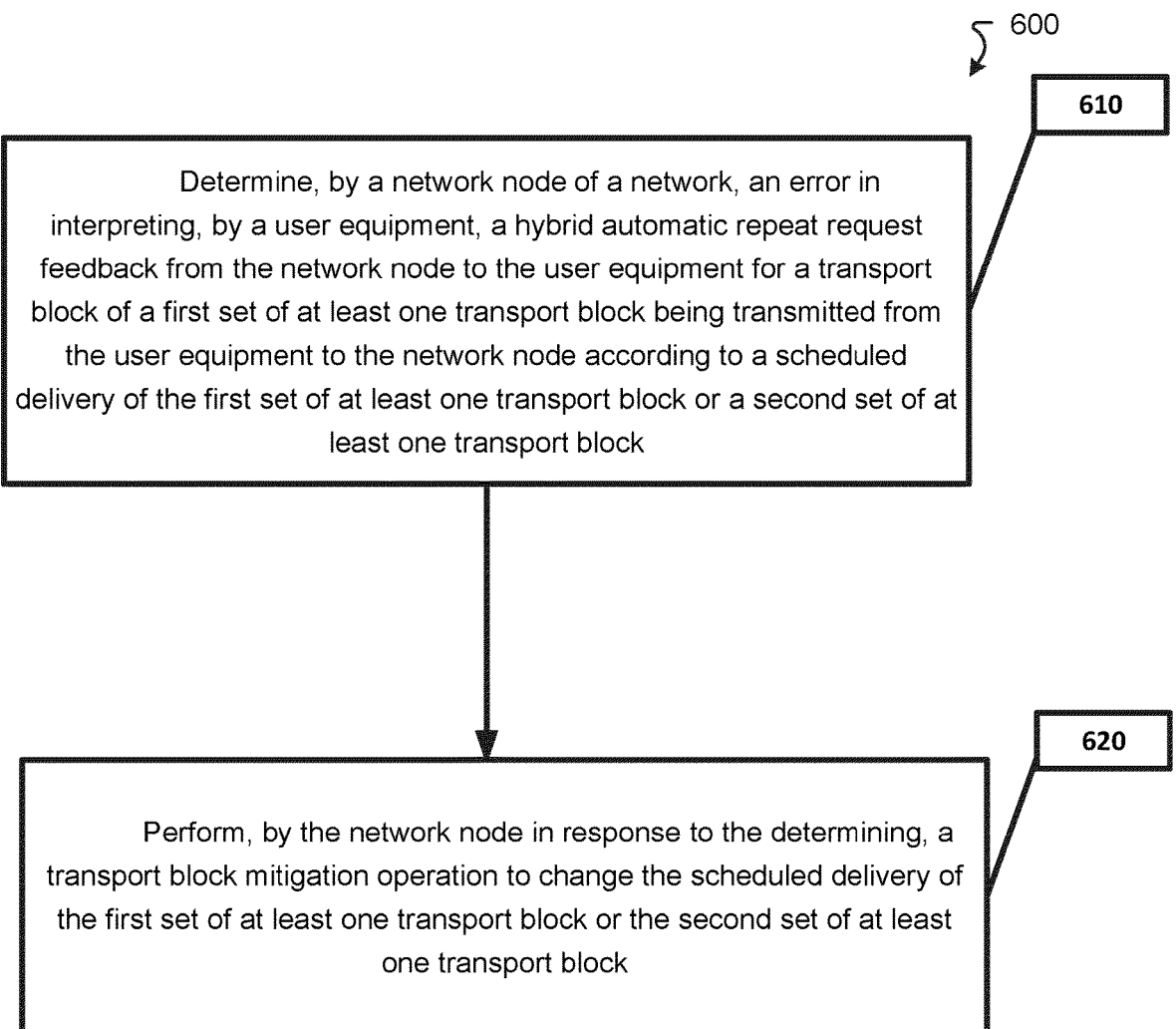
FIG. 6 is a flow chart illustrating a process of correcting an error in interpreting HARQ feedback according to an example implementation

Example 1-1: FIG. 6 is a flow chart illustrating a process 600 of TCS. Operation 610 includes determining, by a network node of a network, an error in interpreting, by a user equipment, a hybrid automatic repeat request feedback from the network node to the user equipment for a transport block of a first set of at least one transport block being transmitted from the user equipment to the network node according to a scheduled delivery of the first set of at least one transport block or a second set of at least one transport block. Operation 620 includes performing, by the network node in response to the determining, a transport block mitigation operation to change the scheduled delivery of the first set of at least one transport block or the second set of at least one transport block.

Example 1-2: According to an example implementation of example 1-1, wherein the error in interpreting the hybrid automatic repeat request feedback includes a failure indication from the network node being interpreted as a successful transmission.

Example 1-3: According to an example implementation of example 1-2, wherein the first set of at least one transport block are included in a single data burst, and wherein performing the transport block mitigation operation includes transmitting indication data representing an indication to the user equipment of a change in the scheduled delivery of the first set of at least one transport block or the second set of at least one transport block.

Example 1-4: According to an example implementation of examples 1-2 and 1-3, wherein the first set of at least one transport block are included in a single data burst, and wherein performing the transport block mitigation operation includes transmitting indication data to the user equipment, the indication data representing an indication for the user equipment to cease transmission of remaining transport blocks of the set of transport blocks.

Example 1-5: According to an example implementation of examples 1-1 to 1-4, wherein determining the error in interpreting, by a user equipment, a hybrid automatic repeat request feedback from the network node to the user equipment includes identifying a first configured grant under which a current data burst with which a transport block is associated was received by the network node as being that under which a previous data burst was sent successfully.

Example 1-6: According to an example implementation of example 1-5, wherein performing the transport block mitigation operation includes, in response to the identifying the first configured grant, transmitting, to the user equipment, command data representing a command to transmit subsequent transport blocks of the first or second set of at least one transport block associated with the current data burst under a second configured grant, the second configured grant being used in response to the previous data burst being sent unsuccessfully.

Example 1-7: According to an example implementation of examples 1-5 to 1-6, wherein performing the transport block mitigation operation includes, in response to the identifying the first configured grant, transmitting, to the user equipment, command data representing a command to transmit at least one subsequent transport block of the first or second set of at least one transport block associated with the current data burst under a dynamic grant.

Example 1-8: According to an example implementation of examples 1-1 to 1-7, further comprising receiving, from the user equipment, a transport block of the set of at least one transport blocks according to a scheduled delivery of the first set of at least one transport block or the second set of at least one transport block from the user equipment to the network node.

Example 1-9: According to an example implementation of examples 1-1 to 1-8, wherein the error in interpreting the hybrid automatic repeat request feedback includes a success indication being interpreted as a failed transmission.

Example 1-10: According to an example implementation of example 1-9, wherein the set of transport blocks are included in a single burst, and wherein determining the error in interpreting, by a user equipment, a hybrid automatic repeat request feedback from the network node to the user equipment includes identifying a second configured grant under which the current burst with which the received transport block was received as being that under which a previous transport block was sent unsuccessfully.

Example 1-11: According to an example implementation of example 1-10, wherein performing the transport block mitigation operation includes, in response to the identifying the second configured grant, transmitting, to the user equipment, indication data representing an indication to the user equipment to transmit subsequent transport blocks of the set of transport blocks associated with the current burst under a first configured grant, the second configured grant being used in response to the previous transport block being sent successfully.

Example 1-12: According to an example implementation of examples 1-10 to 1-11, wherein performing the transport block mitigation operation includes, in response to the identifying the second configured grant, transmitting, to the user equipment, indication data representing an indication to the user equipment to transmit at least one subsequent transport blocks of the set of transport blocks associated with the current burst under a dynamic grant.

Example 13: According to an example implementation of examples 1-10 to 1-12, wherein determining the error in interpreting, by a user equipment, a hybrid automatic repeat request feedback from the network node to the user equipment includes identifying a second configured grant under which the current burst with which the received transport block was included in the second set of at least one transport block.

Example 1-14: According to an example implementation of example 1-13, wherein performing the transport block mitigation operation includes, in response to the identifying the second configured grant, transmitting, to the user equipment, indication data representing an indication to the user equipment to transmit subsequent transport blocks of the set of transport blocks associated with the current burst under a first configured grant, the first configured grant being used in response to the previous burst being sent successfully.

Example 1-15: An apparatus comprising means for performing a method of any of examples 1-1 to 1-14.

Example 1-16: A computer program product including a non-transitory computer-readable storage medium and storing executable code that, when executed by at least one data processing apparatus, is configured to cause the at least one data processing apparatus to perform a method of any of examples 1-1 to 1-14.

Example 2-1: FIG. 7 is a flow chart illustrating a process 800 of performing TSC. Operation 710 includes transmitting, by a user equipment within a network to a network node of the network, a transport block of a first set of at least one transport block according to a scheduled delivery of the first set of at least one transport block from the user equipment to the network node. Operation 720 includes receiving, by the user equipment from the network node, indication data representing an indication that the scheduled delivery of the first set of at least one transport block is to change as a result of an error in interpreting a hybrid automatic repeat request feedback by the user equipment. Operation 730 includes, in response to the indication, performing, by the user equipment, a transport block delivery change operation to change the scheduled delivery of the first set of at least one transport block or a second set of at least one transport block to the network node.

Example 2-2: According to an example implementation of example 2-1, wherein the error in interpreting the hybrid automatic repeat request feedback includes a failure indication from the network node being interpreted as a successful transmission.

Example 2-3: According to an example implementation of example 2-2, wherein the set of transport blocks are included in a single burst, and wherein the indication indicates that a transmission to the network node of a previously-sent transport block of the first set of at least one transport block failed.

Example 2-4: According to an example implementation of examples 2-2 to 2-3, wherein performing the transport block delivery change operation includes ceasing transmission of remaining transport blocks of the first set of at least one transport block or the second set of at least one transport block to the network node.

Example 2-5: According to an example implementation of examples 2-2 to 2-4, wherein the transport block is received by the network node under a first configured grant, the first configured grant being used in response to the previous burst being sent successfully, wherein the received transport block is associated with a different burst than that with which the set of transport blocks is associated, and wherein performing the transport block delivery change operation includes transmitting a subsequent transport block of the first set of at least one transport block or the second set of at least one transport block to the network node under a second configured grant, the second configured grant being used in response to the previous burst being sent unsuccessfully.

Example 2-6: According to an example implementation of examples 2-2 to 2-5, wherein the transport block is received by the network node under a first configured grant, the first configured grant being used in response to the previous transport block being sent successfully, wherein the received transport block is included in the second set of at least one transport block, and wherein performing the transport block delivery change operation includes transmitting a subsequent transport block of the first set of at least one transport block or the second set of at least one transport block to the network node under a dynamic grant.

Example 2-7: According to an example implementation of examples 2-1 to 2-5, wherein the error in interpreting the hybrid automatic repeat request feedback includes a success indication being interpreted as a failed transmission.

Example 2-8: According to an example implementation of example 2-7, wherein the transport block is received by the network node under a second configured grant, the second configured grant being used in response to the previous transport block being sent unsuccessfully, wherein the received transport block is included in the second set of at least one transport block, and wherein performing the transport block delivery change operation includes transmitting a subsequent transport block of the first set of at least one transport block or the second set of at least one transport block to the network node under a first configured grant, the first configured grant being used in response to the previous transport block being sent successfully.

Example 2-9: According to an example implementation of examples 2-7 to 2-8, wherein the transport block is received by the network node under a second configured grant, the second configured grant being used in response to the previous burst being sent unsuccessfully, wherein the received transport block is included in the second set of at least one transport block, and wherein performing the transport block delivery change operation includes transmitting a subsequent transport block of the first set of at least one transport block or the second set of at least one transport block to the network node under a dynamic grant.

Example 2-10: An apparatus comprising means for performing a method of any of examples 2-1 to 2-9.

Example 2-11: A computer program product including a non-transitory computer-readable storage medium and storing executable code that, when executed by at least one data processing apparatus, is configured to cause the at least one data processing apparatus to perform a method of any of examples 2-1 to 2-9.

LIST OF EXAMPLE ABBREVIATIONS

Figure 8:
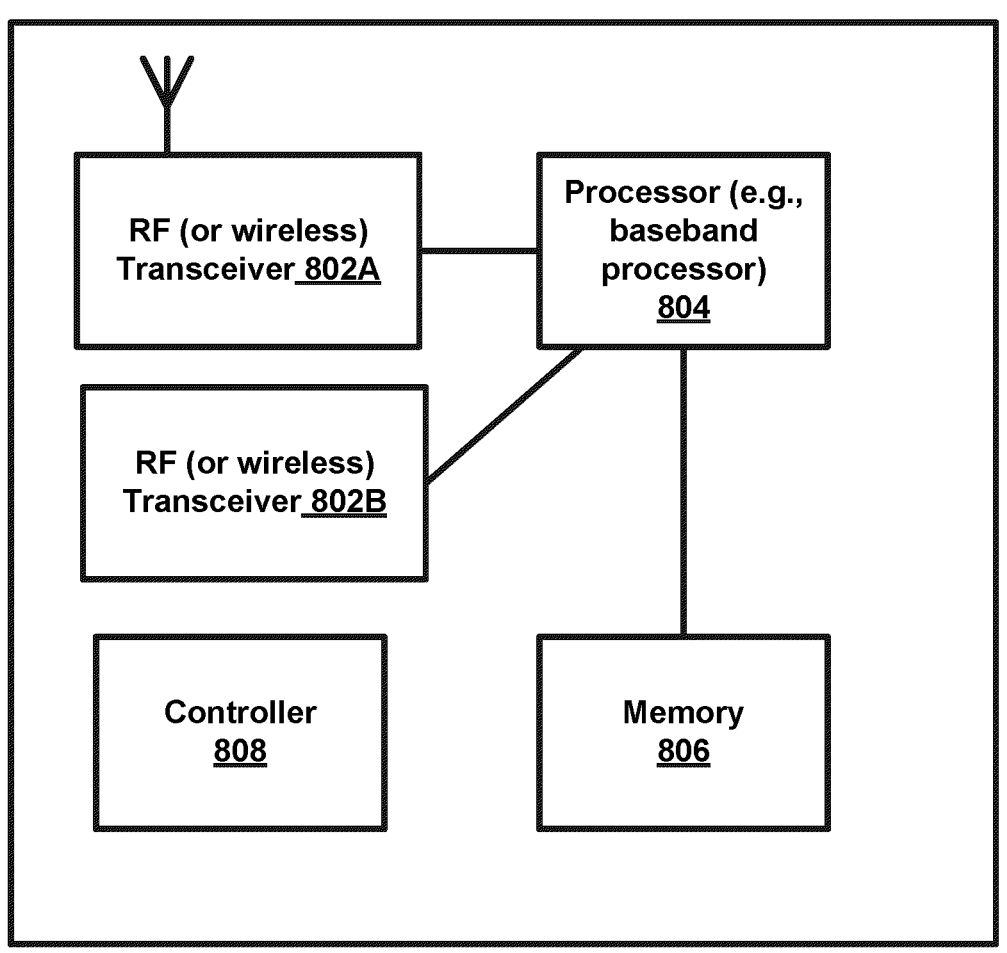
FIG. 8 is a block diagram of a node or wireless station (e.g., base station/access point, relay node, or mobile station/user device) according to an example implementation.

CG Configured Grant
CG-DFI Configured Grant-Downlink Feedback Indication
MDBV Maximum Data Burst Volume
TB Transport Block
TSCAI Time Sensitive Communication Assistant Information FIG. 8 is a block diagram of a wireless station (e.g., AP, BS, e/gNB, NB-IoT UE, UE or user device) 800 according to an example implementation. The wireless station 800 may include, for example, one or multiple RF (radio frequency) or wireless transceivers 802A, 802B, where each wireless transceiver includes a transmitter to transmit signals (or data) and a receiver to receive signals (or data). The wireless station also includes a processor or control unit/entity (controller) 804 to execute instructions or software and control transmission and receptions of signals, and a memory 806 to store data and/or instructions.

Processor 804 may also make decisions or determinations, generate slots, subframes, packets or messages for transmission, decode received slots, subframes, packets or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8 such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. A user device comprising:
   at least one processor; and
   at least one memory including computer program code that, when executed by the at least one processor, causes the at least one processor to perform the following operations:
   prepare a data burst for transmission under a first configured grant, the data burst comprising a first set of a plurality of transport blocks;
   transmit, to a network node of a network, a first transport block of the first set of the plurality of transport blocks according to a scheduled delivery of the first set the plurality of transport blocks using hybrid automatic repeat request (HARQ) retransmission mechanism under the first configured grant;
   receive, from the network node, a HARQ not acknowledge (NACK) in response to the network node not receiving the first transport block;
   interpret the NACK as an acknowledge (ACK);
   based on the interpreting, determine that the first transport block was received successfully by the network node despite receiving the HARQ NACK from the network node indicating the network node did not receive the first transport block;

based on the determining, transmit, to the network node, a second transport block to using the HARQ retransmission mechanism under the first configured grant and not under a second configured grant;

receive, from the network node, indication data representing an indication that the scheduled delivery of the first set of the plurality of transport blocks is to change as a result of an error in interpreting the NACK as an ACK;

based on the indication data, initiate a change in the scheduled delivery of the first set of the plurality of transport blocks by:

ceasing transmission of the data burst under the first configured grant; and initiating a transmission of a second data burst under the second configured grant.

2. The user device of claim 1, wherein the indication data comprises a second HARQ NACK in response to the network node successfully receiving the second transport block.

3. The user device of claim 1, wherein the data burst is a single burst.

4. The user device of claim 1, wherein the error in interpreting the NACK as an ACK is an error, by the user device, in interpreting the NACK as a successful transmission and not as a failed transmission.

5. The user device of claim 1, wherein ceasing the transmission of the data burst comprises ceasing transmission of all remaining transport blocks in the first set of the plurality of transport blocks.

6. The user device of claim 1, wherein initiating the transmission of the second data burst under the second configured grant comprises:

preparing the second data burst for transmission under the second configured grant, the second data burst comprising the first set of a plurality of transport blocks; and transmit, to the network node, the first transport block of the first set of the plurality of transport blocks according to a second scheduled delivery of the first set the plurality of transport blocks using the HARQ retransmission mechanism under the second configured grant.

7. The user device of claim 1, wherein initiating the transmission of the second data burst under the second configured grant comprises:

preparing the second data burst for transmission under the second configured grant, the second data burst comprising a second set of a plurality of transport blocks; and transmit, to the network node, a first transport block of the second set of the plurality of transport blocks according to a second scheduled delivery of the second set the plurality of transport blocks using the HARQ retransmission mechanism under the second configured grant.

8. A method for a user device correcting a not acknowledge (NACK) or acknowledge (ACK) error, the method comprising:

preparing, by the user device, a data burst for transmission under a first configured grant, the data burst comprising a first set of a plurality of transport blocks;

transmit, from the user device to a network node of a network, a first transport block of the first set of the plurality of transport blocks according to a scheduled delivery of the first set the plurality of transport blocks using hybrid automatic repeat request (HARQ) retransmission mechanism under the first configured grant;

receive, by the user device from the network node, a HARQ NACK in response to the network node not receiving the first transport block;

interpret, by the user device, the NACK as an ACK;

based on the interpreting, determine, by the user device, that the first transport block was received successfully by the network node despite receiving the HARQ NACK from the network node indicating the network node did not receive the first transport block;

based on the determining, transmit, by the user device to the network node, a second transport block to using the HARQ retransmission mechanism under the first configured grant and not under a second configured grant;

receive, by the user device from the network node, indication data representing an indication that the scheduled delivery of the first set of the plurality of transport blocks is to change as a result of an error in interpreting the NACK as an ACK;

based on the indication data, initiate, by the user device, a change in the scheduled delivery of the first set of the plurality of transport blocks by:

ceasing transmission of the data burst under the first configured grant; and initiating a transmission of a second data burst under the second configured grant.

9. The method of claim 8, wherein the indication data comprises a second HARQ NACK in response to the network node successfully receiving the second transport block.

10. The method of claim 8, wherein the data burst is a single burst.

11. The method of claim 8, wherein the error in interpreting, by the user device, the NACK as an ACK is an error, by the user device, in interpreting the NACK as a successful transmission and not as a failed transmission.

12. The method of claim 8, wherein ceasing the transmission of the data burst comprises ceasing transmission of all remaining transport blocks in the first set of the plurality of transport blocks.

13. The method of claim 8, wherein initiating the transmission of the second data burst under the second configured grant comprises:

preparing the second data burst for transmission under the second configured grant, the second data burst comprising the first set of a plurality of transport blocks; and transmit, to the network node, the first transport block of the first set of the plurality of transport blocks according to a second scheduled delivery of the first set the plurality of transport blocks using the HARQ retransmission mechanism under the second configured grant.

14. The method of claim 8, wherein initiating the transmission of the second data burst under the second configured grant comprises:

preparing the second data burst for transmission under the second configured grant, the second data burst comprising a second set of a plurality of transport blocks; and transmit, to the network node, a first transport block of the second set of the plurality of transport blocks according to a second scheduled delivery of the second set the plurality of transport blocks using the HARQ retransmission mechanism under the second configured grant.

15. A user device comprising:

at least one processor; and at least one memory including computer program code that, when executed by the at least one processor, causes the at least one processor to perform the following operations:

prepare a data burst for transmission under a first configured grant, the data burst comprising a first set of a plurality of transport blocks;

transmit, to a network node of a network, a first transport block of the first set of the plurality of transport blocks according to a scheduled delivery of the first set the plurality of transport blocks using hybrid automatic repeat request (HARQ) retransmission mechanism under the first configured grant;

receive, from the network node, a HARQ acknowledge (ACK) in response to the network node successfully receiving the first transport block;

interpret the ACK as a not acknowledge (NACK);

based on the interpreting, determine that the first transport block was not received successfully by the network node despite receiving the HARQ ACK from the network node indicating the network node successfully received the first transport block;

based on the determining, ceasing transmission of the data burst;

in response to ceasing transmission of the date burst, receiving, from the network node, an indication that the transmission of the first transport block was received successfully; and based on the indication, resume transmission of remaining transport blocks from the first set of the plurality of transport blocks in the data burst.

16. The user device of claim 15, wherein the data burst is a single burst.

17. The user device of claim 15, wherein interpreting the ACK as a NACK is an error, by the user device, in interpreting the ACK as a failed transmission and not a successful transmission.

18. The user device of claim 15, wherein ceasing the transmission of the data burst comprises ceasing transmission of all remaining transport blocks in the first set of the plurality of transport blocks.

19. The user device of claim 15, wherein resuming transmission of the remaining transport blocks from the first set of the plurality of transport blocks in the data burst comprises resuming transmission of remaining transport blocks from the first set of the plurality of transport blocks in the data burst under the first configured grant.

20. The user device of claim 15, wherein the computer program code, when executed by the at least one processor, further causes the at least one processor to perform the following operations:

in response to ceasing transmission of the data burst, receive, from the network node, a dynamic grant for the user device to transmit the remaining transport blocks from the first set of the plurality of transport blocks in the data burst; and wherein resuming transmission of the remaining transport blocks from the first set of the plurality of transport blocks in the data burst comprises resuming transmission of the remaining transport blocks from the first set of the plurality of transport blocks in the data burst under the dynamic grant and not the first configured grant.

* * * * *